(12) United States Patent
Hill, Jr. et al.

(10) Patent No.: US 7,611,561 B2
(45) Date of Patent: Nov. 3, 2009

(54) DIESEL EXHAUST FILTER CONSTRUCTION

(75) Inventors: Frederick B. Hill, Jr., Clarkston, MI (US); Michael J. Remenar, Grosse Pointe Woods, MI (US)

(73) Assignee: Benteler Automotive Corporation, Auburn Hills, MI (US)

( * ) Notice: Subject to any disclaimer, the term of this patent is extended or adjusted under 35 U.S.C. 154(b) by 167 days.

(21) Appl. No.: 11/779,560

(22) Filed: Jul. 18, 2007

(65) Prior Publication Data

US 2008/0016858 A1 Jan. 24, 2008

Related U.S. Application Data

(60) Provisional application No. 60/832,123, filed on Jul. 20, 2006.

(51) Int. Cl.
| | |
|---|---|
| *B01D 39/00* | (2006.01) |
| *B01D 39/06* | (2006.01) |
| *B01D 39/14* | (2006.01) |
| *B01D 50/00* | (2006.01) |
| *B01D 53/34* | (2006.01) |
| *F01N 3/10* | (2006.01) |
| *F01N 3/08* | (2006.01) |

(52) U.S. Cl. .................. 55/523; 422/171; 422/172; 422/173; 422/174; 422/175; 422/176; 422/177; 422/180; 422/168; 422/169; 422/170; 55/522; 55/524

(58) Field of Classification Search ......... 422/168–180; 55/522–524

See application file for complete search history.

(56) References Cited

U.S. PATENT DOCUMENTS

| | | | | |
|---|---|---|---|---|
| 3,852,041 A | * | 12/1974 | Moore et al. ............... 422/176 |
| 4,126,421 A | * | 11/1978 | Morikawa .................. 422/177 |
| 4,142,864 A | * | 3/1979 | Rosynsky et al. ........... 422/179 |
| 4,208,374 A | * | 6/1980 | Foster ........................ 422/179 |
| 4,795,615 A | * | 1/1989 | Cyron et al. ................ 422/179 |
| 4,913,712 A | | 4/1990 | Gabathuler et al. |
| 5,053,062 A | * | 10/1991 | Barris et al. .................. 55/282 |
| 5,055,274 A | * | 10/1991 | Abbott ....................... 422/171 |
| 5,180,408 A | | 1/1993 | Worner et al. |

(Continued)

FOREIGN PATENT DOCUMENTS

DE 195 38 068 A1 4/1997

(Continued)

*Primary Examiner*—Walter D Griffin
*Assistant Examiner*—Amber Orlando
(74) *Attorney, Agent, or Firm*—Price, Heneveld, Cooper, DeWitt & Litton LLP

(57) ABSTRACT

A diesel exhaust filter construction includes a rectangular filter block, an elongated non-rectangular jacket with oval cross section, and support structure supporting the filter block in a center of the jacket. The support structure includes shielding components forming an insulating air gap with the jacket around the filter block (including a double-layered air gap in "hot" areas), and further includes support structure slidably supporting one end of the filter block to accommodate dissimilar thermal expansion. The structure further includes baffling components with angled surfaces directing input exhaust gases along efficient flow paths from an inlet cone into front, rear, and opposite sides of the filter block and further directing output exhaust gases from top and bottom sides of the filter block toward a longitudinally-centered outlet cone. Some components are identical is shape and size for use in different locations on the construction, thus simplifying tooling.

10 Claims, 7 Drawing Sheets

U.S. PATENT DOCUMENTS

| | | | |
|---|---|---|---|
| 5,293,743 A * | 3/1994 | Usleman et al. | 60/299 |
| 5,419,876 A * | 5/1995 | Usui et al. | 422/177 |
| 5,470,364 A | 11/1995 | Adiletta | |
| 5,916,530 A * | 6/1999 | Maus et al. | 422/179 |
| 6,013,118 A | 1/2000 | Matsunuma et al. | |
| 6,116,022 A * | 9/2000 | Woodward | 60/300 |
| 6,128,821 A * | 10/2000 | Grescher | 29/890 |
| 6,162,403 A * | 12/2000 | Foster et al. | 422/173 |
| 6,334,981 B1 * | 1/2002 | Wieres | 422/177 |
| 6,368,726 B1 * | 4/2002 | Holpp et al. | 428/593 |
| 6,555,070 B1 | 4/2003 | Krueger | |
| 6,739,124 B2 | 5/2004 | Huthwohl et al. | |
| 6,755,016 B2 | 6/2004 | Dittler et al. | |
| 6,773,479 B2 | 8/2004 | Debenedetti et al. | |
| 6,875,407 B1 | 4/2005 | Biel, Jr. et al. | |
| 6,884,398 B1 | 4/2005 | Biel, Jr. et al. | |
| 6,899,853 B1 * | 5/2005 | Diez et al. | 422/179 |
| 6,908,595 B1 * | 6/2005 | Biel, Jr. et al. | 422/179 |
| 6,923,941 B2 | 8/2005 | Huthwohl et al. | |
| 6,935,103 B2 | 8/2005 | Binder et al. | |
| 6,942,838 B1 * | 9/2005 | Morishita | 422/179 |
| 7,155,902 B2 * | 1/2007 | Nakagome | 60/299 |
| 7,238,327 B2 * | 7/2007 | Irving et al. | 422/179 |
| 7,244,285 B2 | 7/2007 | Huthwohl et al. | |
| 7,297,174 B2 * | 11/2007 | Geise et al. | 55/490 |
| 7,404,934 B2 * | 7/2008 | Haag | 422/180 |
| 2004/0055265 A1 * | 3/2004 | Ohno et al. | 55/523 |
| 2004/0096371 A1 * | 5/2004 | Haag | 422/171 |
| 2004/0216452 A1 * | 11/2004 | Nakagome | 60/299 |
| 2005/0172588 A1 * | 8/2005 | Geise et al. | 55/410 |
| 2006/0213163 A1 * | 9/2006 | Taoka et al. | 55/523 |
| 2008/0236123 A1 * | 10/2008 | Chen et al. | 55/523 |

FOREIGN PATENT DOCUMENTS

| | | |
|---|---|---|
| DE | 196 41 049 A1 | 4/1998 |
| DE | 10 2005 006122 A1 | 9/2005 |
| EP | 1 437 490 A | 1/1991 |
| JP | 62 284915 A | 12/1987 |

* cited by examiner

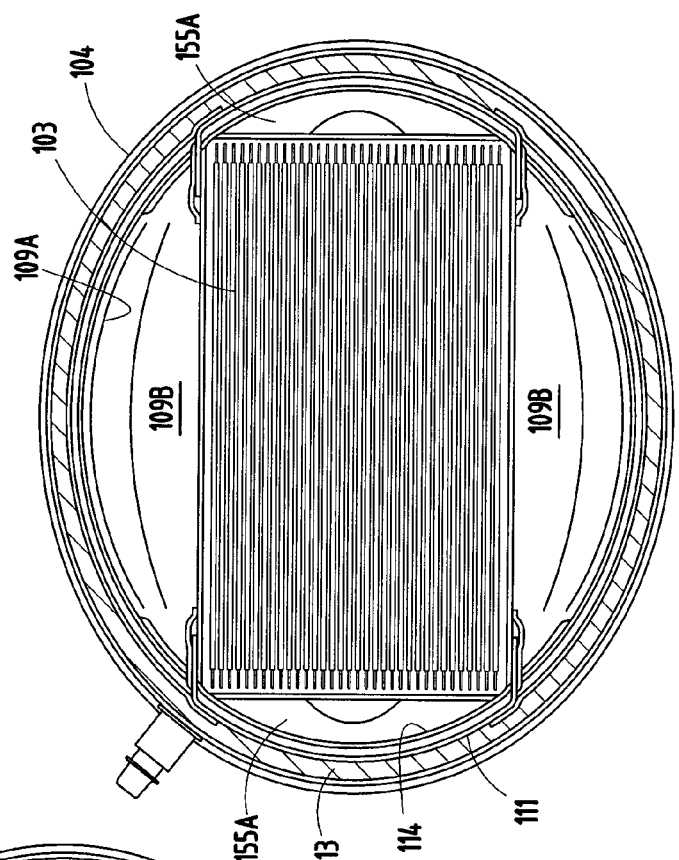
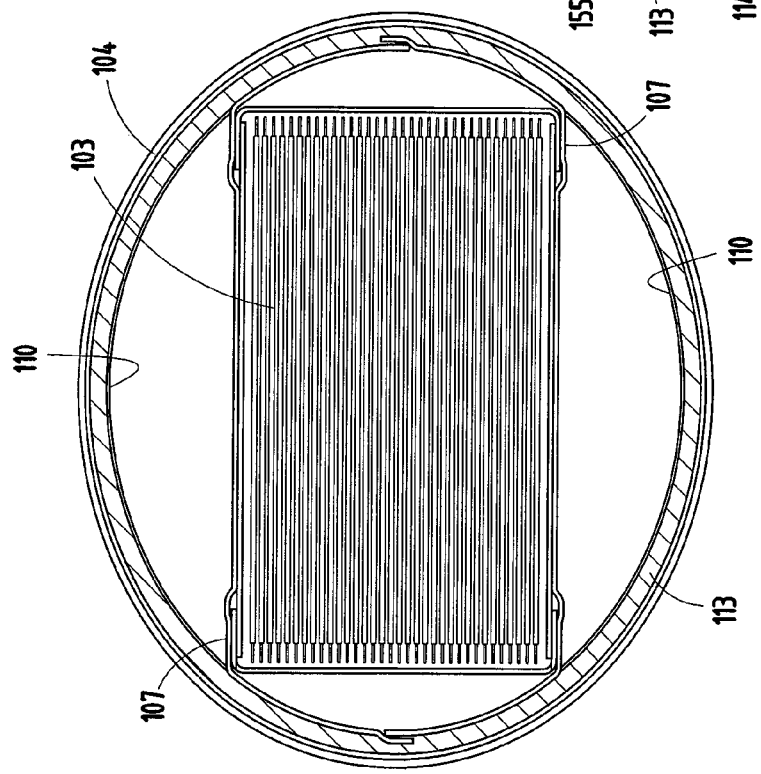
FIG. 6
FIG. 5

DIESEL EXHAUST FILTER CONSTRUCTION

CROSS REFERENCE TO RELATED APPLICATION

This application claims benefit under 35 U.S.C. § 119(e) of provisional application Ser. No. 60/832,123, filed Jul. 20, 2006, entitled SUPPORT STRUCTURE FOR DIESEL EXHAUST FILTER ELEMENT.

BACKGROUND

The present invention relates to diesel exhaust treatment devices for internal combustion engines and the like, and in particular relates to a diesel exhaust filter construction for reducing undesirable emissions, for reducing assembly and component cost, and for increasing operating efficiency of the device.

Modern diesel engines are provided with diesel exhaust treatment devices to reduce environmentally-unfriendly gaseous emissions and particulate emissions. These devices are becoming increasingly complex, both in terms of components and function. An improved diesel exhaust filter construction is desired that uses less components and less costly components, that uses components facilitating assembly and also long term durability, and that assemble to provide optimal handling of the exhaust gases while also providing an efficient flow through and reduced back pressure on exhaust gases coming to the device from a diesel engine.

SUMMARY OF THE PRESENT INVENTION

In one aspect of the present invention, an exhaust filter assembly for filtering particulates from exhaust gases from a diesel engine includes a particulate filter block including a plurality of elements that are adapted to filter the exhaust gases. A jacket is formed around the filter block, the jacket defining an inlet and outlet for directing flow of the exhaust gases into and out of the filter block, respectively. Filter-block-supporting components support the filter block in the jacket, the filter-block-supporting components forming a fixed support and a sliding support that combine to allow dissimilar thermal expansion within the exhaust filter assembly without causing associated mechanical stress.

In another aspect of the present invention, an exhaust filter assembly for filtering exhaust gases from a diesel engine includes a filter block adapted to filter exhaust gases from a diesel engine. A jacket is formed around the filter block, the jacket defining an inlet and outlet for flow of the exhaust gases into and out of the filter block, respectively. A shield subassembly is positioned between the filter block and the jacket that supports the filter block generally in the center of the jacket. The shield subassembly includes first and second shield members that are identical in shape and size and that are positioned to both substantially encapsulate the filter block and also form an air gap with the jacket, the air gap extending fully around a circumference of the filter block and along at least a majority of a length of the filter block.

In yet another aspect of the present invention, an exhaust filter assembly for filtering exhaust gases from a diesel engine includes a filter block including a plurality of elements adapted to filter particles from the exhaust gases of a diesel engine, the filter block defining a rectangular box shape with upstream and downstream ends, right and left sides, and top and bottom sides. At least the upstream and downstream ends include inlet openings for receiving exhaust gases. The top and bottom sides each include at least one outlet opening for emitting filtered exhaust gases. The assembly further includes an elongated non-rectangular jacket subassembly formed around the filter block, the jacket subassembly including an upstream jacket cone defining a circular primary inlet and including a downstream jacket cone defining a circular primary outlet for the exhaust passing through the exhaust filter assembly and further defining a longitudinal direction. An upstream inlet cone supports the filter block and also communicates the exhaust gases from the primary inlet to the inlet openings of the upstream end and that further communicates a portion of the exhaust gases outward along the sides of the filter block to a downstream end of the filter block. A filter end cover directs the portion of exhaust gases into the inlet openings of the downstream end of the filter block. At least one baffle support both supports the filter block and directs the exhaust gases from the outlet openings of the top and bottom sides of the filter block toward the primary outlet. At least the baffle support and the upstream inlet cone include exhaust-directing angled surfaces that extend at an acute angle to the longitudinal direction so that the exhaust gases flowing through the exhaust filter assembly flow with a more uniform flow and with less perpendicular wall structure creating turbulent resistance to flow.

In a narrower aspect, the construction is designed to channel flow into front, rear and two sides of the filter block and out two (top and bottom) side exit holes in the filter block into a core centerline flow, with the supports for the filter block acting as sliding support in at least one area on the filter block to accommodate dissimilar thermal expansion on components.

In yet another aspect of the present invention, an exhaust filter assembly for filtering exhaust gases from a diesel engine includes a filter block adapted to filter exhaust gases from a diesel engine. A jacket is formed around the filter block, the jacket defining an inlet and outlet for flow of the exhaust gases into and out of the filter block, respectively. A shield subassembly is positioned between the filter block and the jacket, the shield subassembly including shield members with embossments that support the shield members away from the jacket to thus form an air gap that extends substantially fully around a circumference of the filter block and along at least a majority of a length of the filter block. Basalt wool insulation is positioned in the air gap and takes up some space in the air gap to further reduce surface temperature.

An object of the present invention is to provide a support structure for sintered metal diesel filter elements and the like, wherein formed channels joined to a filter block of sintered metal sheets position the filter block in an associated jacket to form an insulating air gap. A sliding circular pipe supports the rear mass of the core and allows free thermal expansion of the filter block, while the fixed inlet cone supports the front half mass of the core and reacts to dynamic loads.

Another object of the present invention is to provide a diesel filter element that integrates several functions, so as to reduce the total number of parts in the assembly, simplify their construction, properly channel exhaust gas flow, form an internal heat shield, and support an associated filter block in the jacket in a manner which accommodates free thermal expansion of the core.

Yet another object of the present invention is to provide a diesel filter element that is efficient in use, economical to manufacture, capable of long operating life, and particularly well adapted for the proposed use.

These and other aspects, objects, and features of the present invention will be understood and appreciated by those skilled in the art upon studying the following specification, claims, and appended drawings.

BRIEF DESCRIPTION OF DRAWINGS

FIGS. 5-6 are transverse cross sections taken generally through a mid-point of the device, FIG. 5 looking upstream and FIG. 6 looking downstream.

DETAILED DESCRIPTION OF PREFERRED EMBODIMENTS

Figure 1:
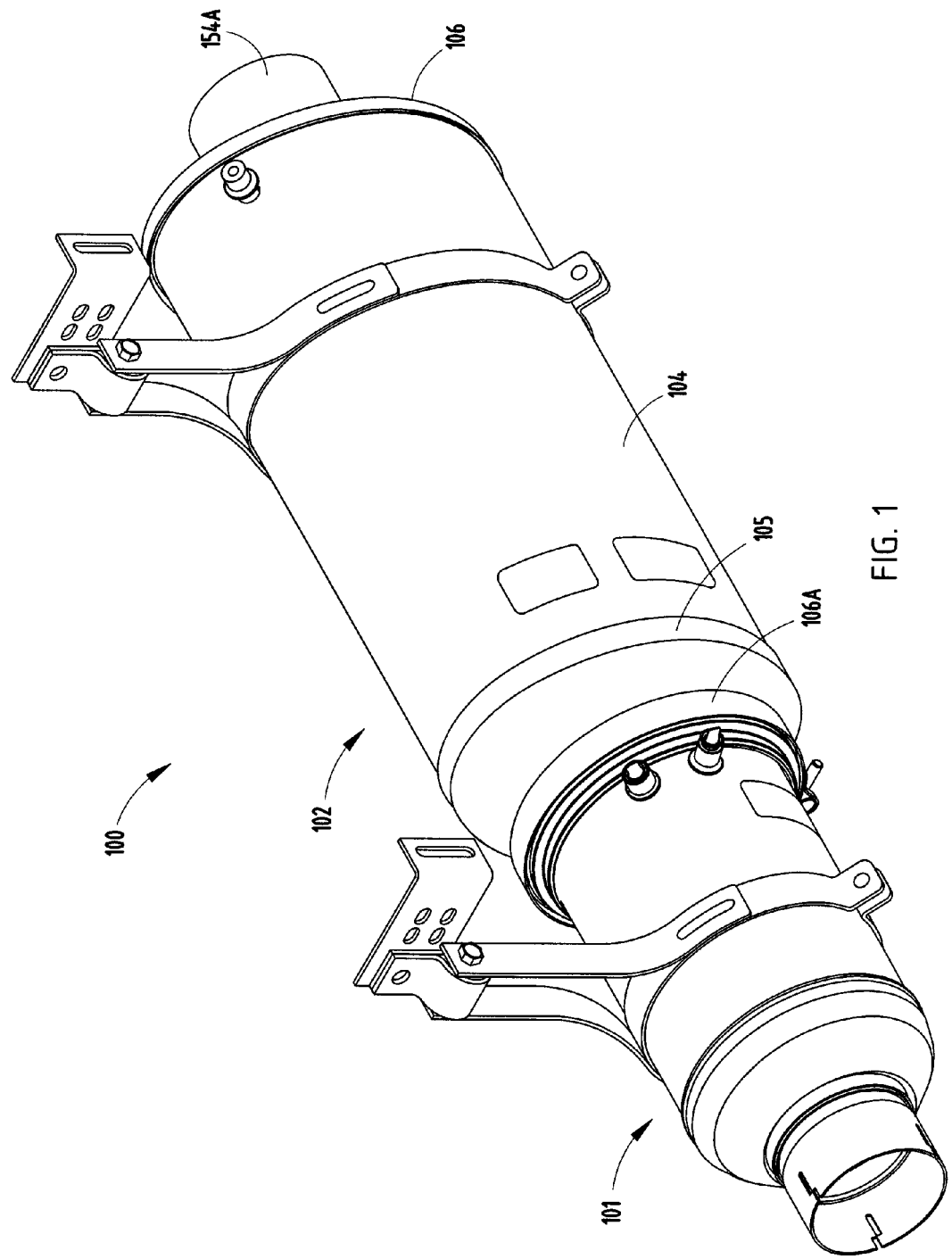
FIG. 1 is a perspective view showing the diesel exhaust device including a diesel oxidation catalyst (DOC) subassembly and diesel particulate filter (DPF) subassembly.

A diesel exhaust device 100 (FIGS. 1-3) includes a DOC subassembly 101 with diesel oxidation catalyst (DOC) for chemically treating diesel exhaust and a diesel particulate filter (DPF) subassembly 102 adapted to filter particulate from diesel exhaust. The subassemblies use known technologies to accomplish their purposes such that their physical and chemical properties, and also their operating systems, do not need to be described in detail for a person of ordinary skill to understand the present invention. However, the present DPF subassembly 102 is particularly and inventively constructed to provide advantages as noted below.

The present DPF subassembly 102 (FIG. 2) includes a rectangular particulate filter block 103 comprising a plurality of closely-spaced parallel particulate-filtering sintered metal plates sandwiched between a pair of carrier plates, an elongated non-rectangular jacket 104 with oval cross section, and components forming a support structure for supporting the filter block 103 generally in a center of the jacket 104. As described below, the support structure includes components forming an insulating air gap around the filter block (filled with Basalt wool for improved insulating performance), and further includes support structure slidably supporting one end (i.e., a downstream end) of the filter block to accommodate dissimilar thermal expansion of about 4 to 8 mm (typically about 4.5 to 5 mm) between the filter block 103 and the jacket 104, and still further includes baffling components with angled surfaces directing inflowing exhaust gases from an inlet cone into front, rear, and right/left sides of the filter block and further directing outflowing exhaust gases from a top and bottom of the filter block downstream toward a longitudinally-centered outlet cone. Some components are identical in shape and size for use in different locations on the construction, thus simplifying tooling.

Figure 7:
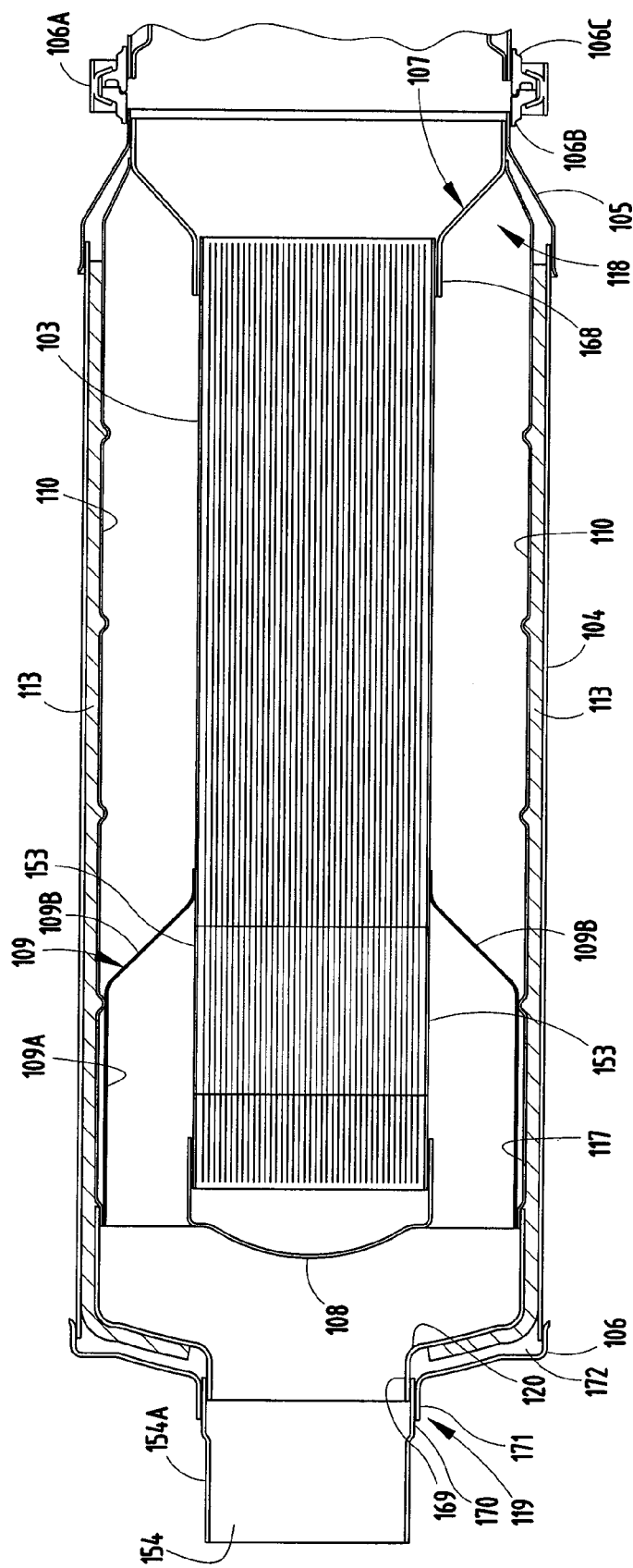
FIGS. 7 and 8 are longitudinal cross sections, FIG. 7 showing an elevated side view of internal structure, and FIG. 8 showing a plan top view of internal structure.

As noted above, the DOC subassemblies are generally known in the art and are commercially available, such that a detailed description of that structure is not required for an understanding of the present invention by a person skilled in this art. The present DOC subassembly 101 is attached in-line to the DPF subassembly 102 as illustrated in FIGS. 1 and 7 by a clamp 106A and gasket that matably join mating configured ends 106B and 106C.

Figure 2:
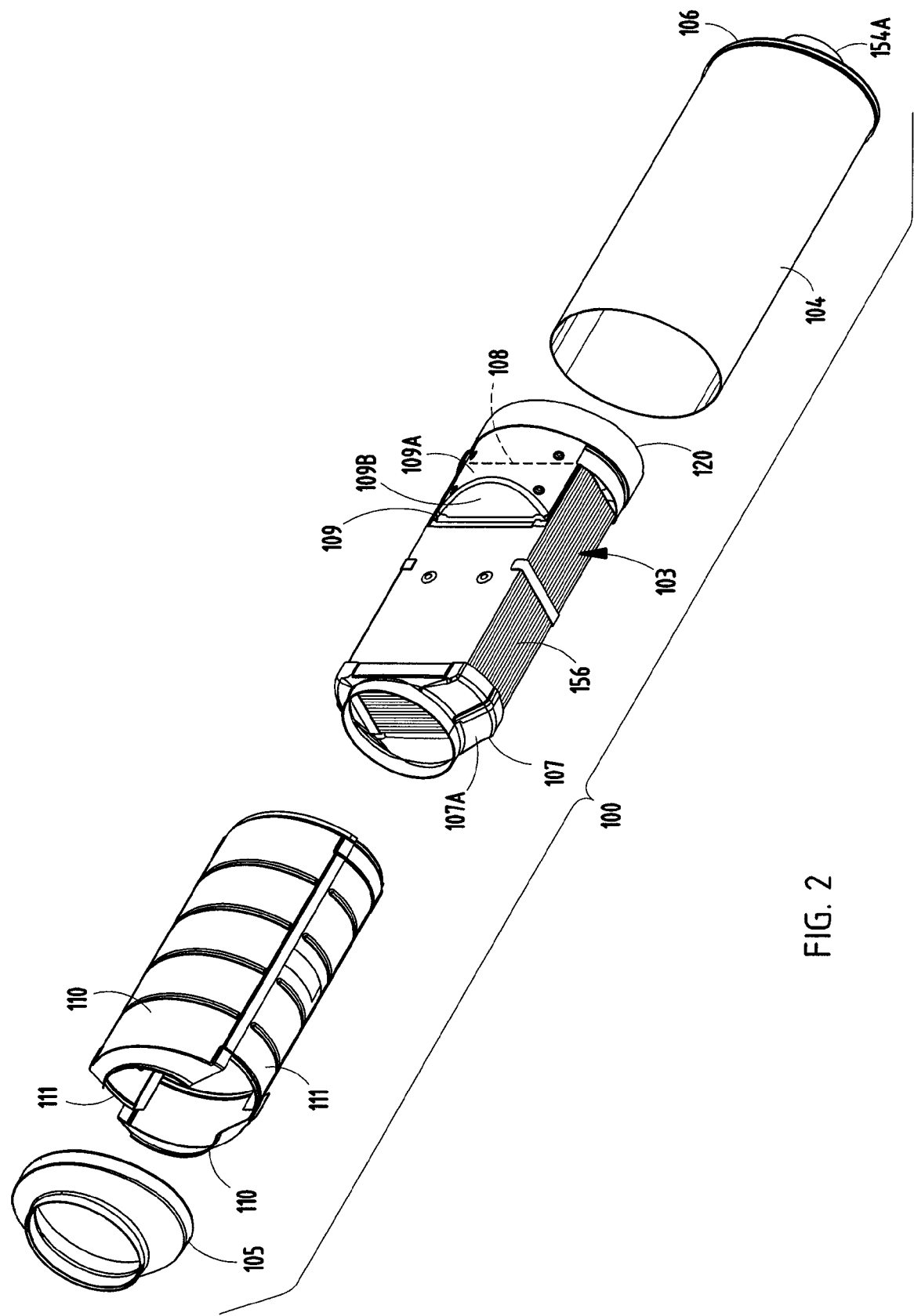
FIG. 2 is a partially exploded perspective view of FIG. 1.
Figure 3:
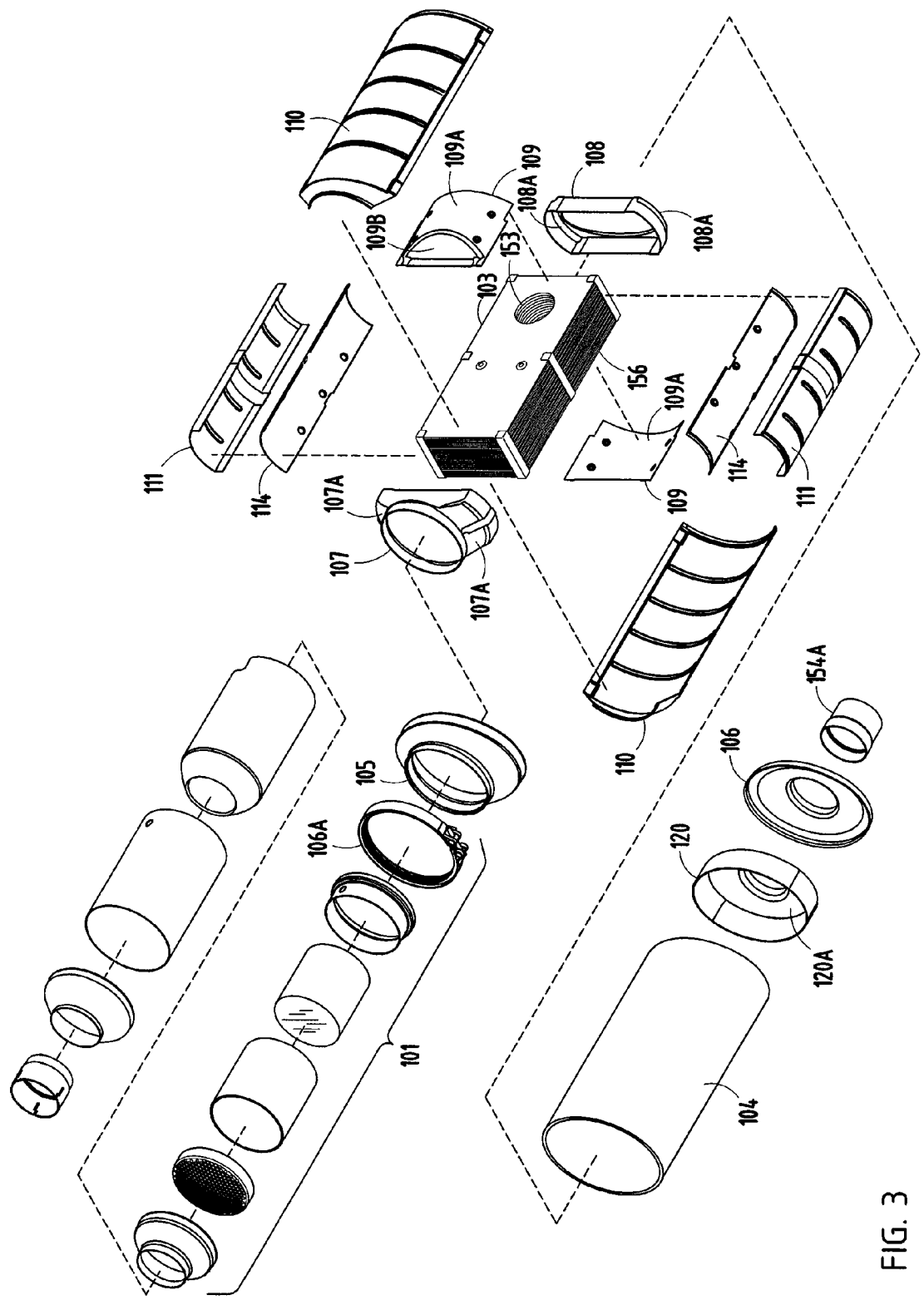
FIG. 3 is a fully exploded perspective view of FIG. 2.
Figure 8:
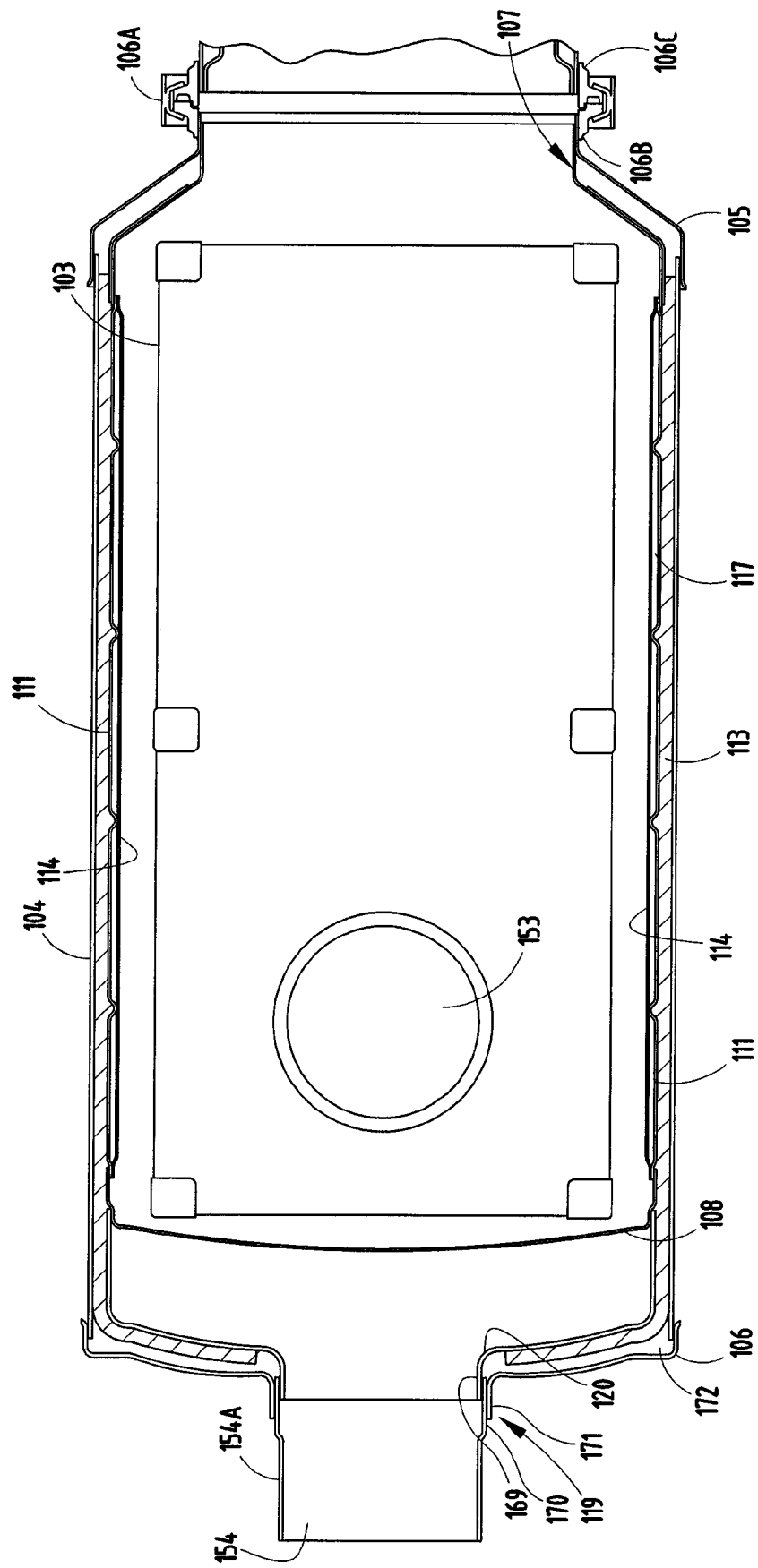

FIG. 2 shows the outer jacket 104 with mating jacket inlet cone 105 and jacket outlet cone 106. The inlet cone 105 transitions from a round receiving end to a downstream oval-shaped end (for engaging the jacket 104), and the outlet cone 106 has a shape that provides a reverse transition. The filter block 103 is shown with a filter inlet cone 107 (formed by identical top and bottom parts), a downstream filter end cover 108, and flow baffles 109 (only the top one being visible in FIG. 2). The support components include the filter end cover 108, which supports a downstream end of the filter block 103 while permitting exhaust gases to flow from lateral sides of the filter block around and into a downstream end of the filter block 103, as described below. The support components also include the baffles 109 as described below. (See FIGS. 4 and 8). The support components also include identical top and bottom shields 110 and identical side shields 111 for surrounding the filter block 103 its full length. The illustrated shields 110 and 111 combine to form a "shield subassembly" that extends around a circumference of the filter block 103 and that extends along a full length of the filter block 103. The shields 110 and 111 include outwardly projecting channel-shaped embossments causing them to form an air gap to the jacket 104 that extends circumferentially and longitudinally around the filter block 103. By making the top and bottom shield components 110 and also the side shield components 111 identical in shape, it saves considerably in their manufacture, since it reduces tooling cost considerably.

Figure 4:
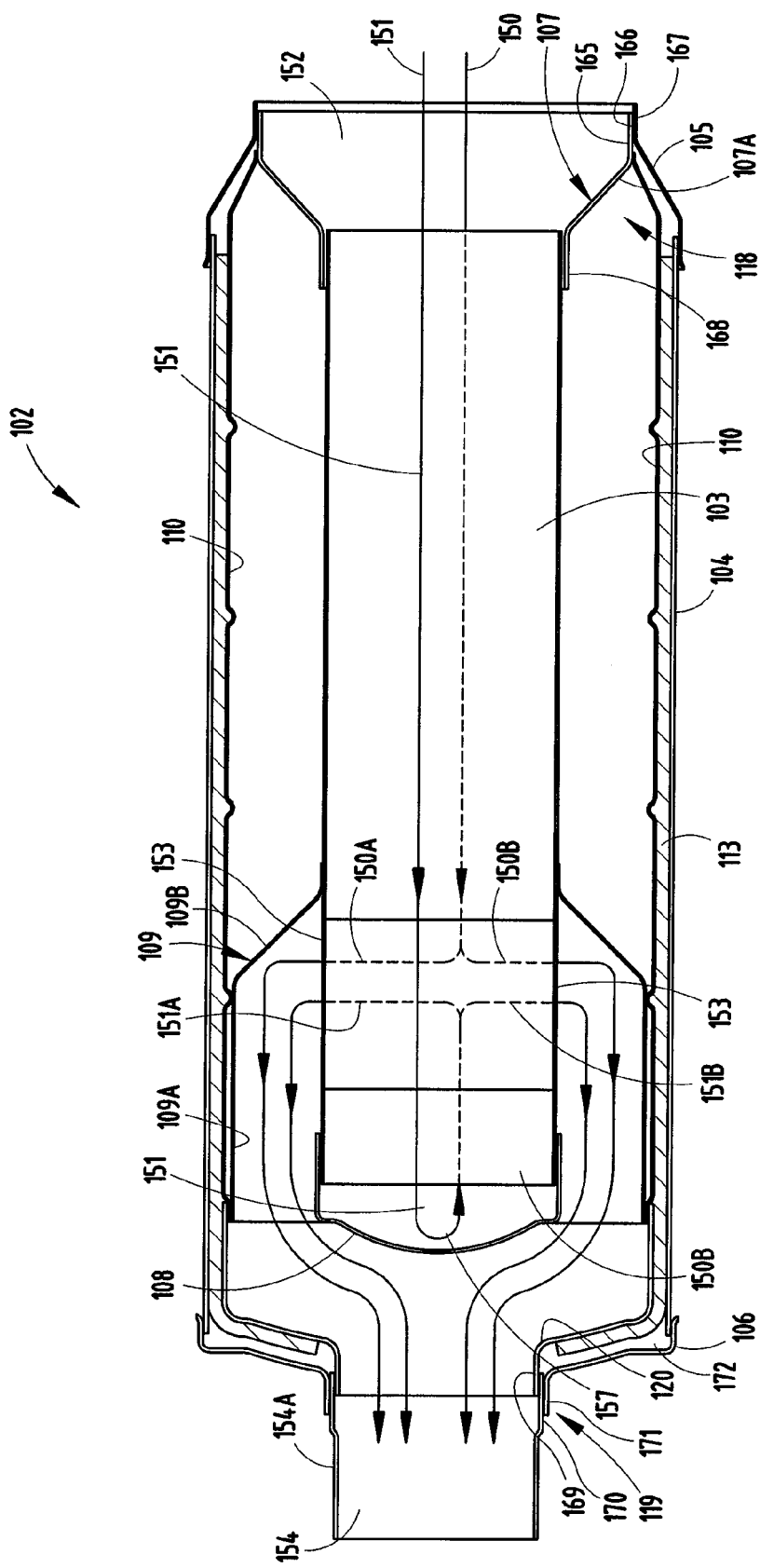
FIG. 4 is a side view, simplified for clarity, showing flow of exhaust gases through the device of FIG. 1.

The air gap as illustrated is filled by Basalt wool insulation 113 (FIGS. 7 and 8) for providing a maximum insulating value. Side-located secondary insulation shields 114 (FIGS. 3 and 8) on an inside of the side shields 111 form an additional air gap with the jacket 104 around sides of the filter block 103. This additional air gap that helps reduce hot spots on the jacket 104 along sides of the filter block 103 which occur due to the directed flow of exhaust gases along the "lateral" flow paths 150A (FIG. 4). As noted below, the downstream-extending flange 109A of the baffles 109 also provide an additional air gap 117 to the shields 110 at a location that reduces another hot spot on the jacket 104. The air gaps combine to form a continuous air gap completely around the filter block 103 and that extends along a majority of a length of the filter block 103, with "double" air gaps in key areas.

Notably, the top and bottom baffles 109 are identical in shape, and include a longitudinally-extending awning-like portion 109A that extends along the jacket 104 to form a second air gap 117 (FIG. 7), and also include an angled baffling portion 109B that deflects exhaust gases coming out of the (top and bottom) holes 153 in the filter block 103 in a desired downstream direction. The baffle 109 is constructed to support a downstream end of the filter block 103 in the jacket 104/shields 110/111. The angled baffling portion 109B of the baffle 109 creates a more uniform flow and reduces turbulence and air drag, and thus in turn reduces resistance to air flow through the device 102. Notably, the reduced resistance to air flow through the device 102 directly contributes to improved gas mileage, since reduced back pressure at the diesel engine exhaust manifold results in engine operating efficiencies. The awning-like portion 109A creates an additional air gap to the shields 110 that reduces a hot spot on the jacket 104 due to exhaust gas flow coming out of the openings 153 in the filter block 103. The air gaps and Basalt wool insulation minimize the skin temperature of the DPF device 102 and hence minimize heat loss. The baffles 109 combine with adjacent components to prevent the lateral flow of exhaust gases from bypassing the filter block 103. Thus, the baffles 109 force the lateral flow into the end cover 108, which in turn directs the lateral flow into a downstream end of the filter block 103.

The upstream end of the filter block 103 is supported by a fixed support system at location 118. The downstream end of the filter block 103 is slidably supported by a slip-permitting support at location 119, which is formed in part by a liner end cone 120. It is contemplated that additional supports could be added as needed to support the filter block 103 in a center of the oval-shaped jacket 104. The fixed support system at location 118 is provided by the filter inlet cone 107, which includes an upstream flange 165 on the filter inlet cone 107 fixedly connected to upstream flanges 166 and 167 on the jacket inlet cone 105 and on the shields 110/111, respectively, and also includes a downstream flange 168 on the filter inlet cone 107 fixedly connected to a top and bottom edges of an upstream end of the filter block 103. Notably, the filter inlet cone 107 permits exhaust gases to flow laterally around right and left edges of the front end. The sliding support location 119 is provided by the (downstream) liner end cone 120, which includes a downstream flange 169 on the liner end cone 120 slidably engaging the flange 170 on the outlet tube 154A (which is supported by the flange 171 on the outlet cone 106). Note the gap 172 between the liner end cone 120 and the outlet cone 106 which permits the dissimilar thermal expansion of the inner components relative to the jacket 104 of about 4 to 8 mm longitudinally, or more typically about 4.5 to 5 mm longitudinally. Notably, the above structure provides support to the filter block 103, as well as fixed support at one end and sliding support at the other end of the filter block 103. The support for the downstream end of the filter block 103 is provided by the baffles 109, and by the end cover 108.

Several components include angled gas-baffling portions, such as the components 107, 108, 109, and 120, which include angled baffling portions 107A, 108A, 109B, 120A (FIGS. 3 and 4) with angled surfaces. The angled gas-baffling portions extend at a non-perpendicular angle relative to a longitudinal direction defined by the jacket 104. Their specific angle can be varied, depending on the overall spatial dimensions required for the device 102, and depending on the overall functional requirements of the device 102, such as gas-volume-handling requirements, back pressure requirements, residue-holding requirements, and the like. The angled surfaces are designed to deflect exhaust gases in a manner creating an optimal gas flow with minimal air turbulence and back pressure, thus reducing back pressure on exhaust gases coming from the engine. Notably, walls in a DPF device that are perpendicular to exhaust gas flow will tend to create a more inefficient flow of the exhaust gases . . . which leads to higher air back pressures. At the same time, incorporating angled wall portions can lead to a difficult assembly and more expensive components, thus making their design a challenging task. Accordingly, the angled wall portions of the present design are believed to be innovative, and they are believed to provide surprising and unexpected results in terms of their construction, assembly, and function.

The present inventive components and their assembly combine to define multiple sealed air passages that lead through different areas of the filter block 103. See FIG. 4 which shows a first gas flow path being straight into an upstream end of the filter block and out top and bottom openings of the filter block toward the downstream outlet, and which also shows a second path extending from the inlet laterally to sides of the filter block and into a rear end of the filter block and then out the top and bottom openings of the filter block toward the downstream outlet. The exhaust gases are divided into various streams as they are forced to travel along one of the predetermined paths through the device 102 (see FIG. 4). These angled baffling portions direct the flow of exhaust gases to provide the benefits listed above. Another benefit of the present components and baffles is that the exhaust gases flow through a larger percentage of the filter block 103, such that the filter block 103 is used more efficiently. For example, as one area of the filter block 103 becomes nearly "plugged," the exhaust gases are forced toward other areas. This results in a more efficient and longer lasting use of the filter block 103, and further reduces the time between soot regenerations. Persons skilled in this art will understand that soot regeneration is where the filter block 103 becomes filled with soot and undergoes a heat cycle where the carbon and other combustibles are "burned off." This leaves a residue of unburnable material called "ash." The present device 102 is constructed with large deposit-receiving areas below and around the filter block 103, and further includes passages extending around the deposit-receiving areas, thus making the present device longer lasting because it can hold a larger amount of unburnable residue before the DPF device 102 becomes overfilled and requires maintenance for efficient operation. It is significant that the present device 102 provides several (non-blocked) pathways for the exhaust gases to flow through the device 102, which provides for alternative exhaust gas flow even when the unburnable residue builds up.

The flow of exhaust gases (see FIG. 4 for flow, and FIG. 3 for some features) includes two flow streams 150 and 151 (FIG. 4) which pass from the DOC subassembly 101 into the inlet opening 152 of the DPF subassembly 102. The filter inlet cone 107 allows the incoming exhaust gases of stream 150 to pass directly longitudinally into the upstream end of the filter block 103, and then to flow along divided flows 150A and 150B out top and bottom outlet ports 153 in the filter block 103. The baffles 109 direct the flows 150A and 150B toward the outlet opening 154 in an outlet tube 154A of the subassembly 102. The flow 151 divides into lateral flows as it encounters a front of the filter block 103, and as a result it flows laterally (sideways) out the right and left wings 155 of the inlet cone 107 to locations 155A (FIG. 6) adjacent the sides of the filter block 103. The flow 151 travels along the filter block 103, and then either enters a side 156 of the filter block 103, or alternatively it flows to the filter end cover 108. The filter end cover 108 receives the lateral flows and directs the flows in a reverse direction 157 into the downstream end of the filter block 103. A top portion 151A of the divided flow 151 joins with the flow 150A to exit the top outlet port 153, and a bottom portion 151B of the divided flow 151 joins with the flow 150B to exit the bottom outlet port 153. The baffles 109 direct the combined flows out the outlet opening 154 as noted above. Notably, as the filter block 103 fills with non-burnable residue, the flow 150 reduces, causing the flow 151 to increase. Also, the flows are affected by the regeneration cycles of the device 102 for burning off carbon and other burnable materials captured in the filter block 103. This is monitored in part by a temperature sensor (see right end of FIG. 1, or left upper corner of FIG. 6) which is connected to a vehicle control emission system.

A unique feature of the present device 102 is the canning of a rectangular metal filter block into an oval section. Common designs of filters are all cylindrical with uni-axial flow in/out. This design channels flow in four sides and out two exit holes. This is accomplished by adding the inlet cone half-shell 105 which changes section and shape as previously described and the outlet cone 106 which joins the two exit flows into one centerline flow through a sliding pipe support of the core.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. An exhaust filter assembly for filtering exhaust gases from a diesel engine, comprising: a particulate filter block including a plurality of elements that are adapted to filter particulates from exhaust gases and including top and bottom outlet openings for exhaust gases exiting the filter block; a jacket subassembly formed around the filter block, the jacket subassembly including an inlet cone and outlet cone shaped to direct defining an inlet and outlet for directing flow of the exhaust gases into and out of the filter block, respectively; and baffles supporting the downstream end of the filter block, and the inlet cone supporting the inlet end of the filter block, the baffles including an angled baffling portion that deflects exhaust gases coming from the outlet openings in the filter block in a desired downstream direction.

2. An exhaust filter assembly for filtering exhaust gases from a diesel engine, comprising:
   a filter block adapted to filter exhaust gases from a diesel engine;
   a jacket subassembly formed around the filter block, the jacket subassembly defining an inlet and outlet for flow of the exhaust gases into and out of the filter block, respectively, and defining a primary air gap around a majority of a length of the filter block;
   at least one baffle supporting one end of the filter block;
   a shield subassembly positioned between the filter block and the jacket subassembly, the shield subassembly including shield members with one of the shield members and the jacket subassembly including embossments that support the shield members away from the jacket subassembly to thus form a second air gap that extends substantially at least partially around a circumference of the filter block and along at least a majority of a length of the filter block; and
   basalt wool insulation positioned in at least one of the air gaps and taking up some space in the one air gap to further reduce outside surface temperature of the jacket subassembly;
   the at least one baffle including an awning-like portion forming with the jacket subassembly another air gap, the primary, second, and another air gaps forming a double-gap-insulated construction around a majority of the filter block.

3. The assembly of claim 2, wherein the filter block, the jacket subassembly, the shield subassembly, and the at least one baffle define at least one first air flow channel directing exhaust gases from the inlet into a first end of the filter block, and further define at least one second air flow channel directing exhaust gases from the inlet into an opposite second end of the filter block, and further define at least one third air flow channel directing exhaust gases from sides of the filter block to the outlet.

4. The assembly of claim 2, wherein the shield members include mating identical sets of shield members that mate together to form an encapsulating subassembly around the filter block, the encapsulating subassembly being inside of and spaced from the jacket.

5. The assembly of claim 2, wherein the inlet is a cone that forms a part of the fixed support.

6. The assembly of claim 2, wherein the particulate filter block has a rectangular cross section, and wherein the jacket has an oval cross section fitting around the rectangular cross section.

7. An exhaust filter assembly for filtering exhaust gases from a diesel engine, comprising:
   a filter block including a plurality of elements adapted to filter particles from the exhaust gases of a diesel engine, the filter block defining a rectangular box shape with upstream and downstream ends, right and left sides, and top and bottom sides; at least the upstream and downstream ends including inlet openings for receiving exhaust gases; the top and bottom sides each including an outlet opening for emitting filtered exhaust gases;
   an elongated non-rectangular jacket subassembly having an oval cross section formed around the filter block, the jacket subassembly including an upstream jacket cone defining a circular primary inlet and including a downstream jacket cone defining a circular primary outlet for the exhaust passing through the exhaust filter assembly and further defining a longitudinal direction; the jack subassembly including an outer jacket and inner shields forming a first insulating air gap around a majority of the filter block;
   an upstream inlet cone that supports the filter block and that also communicates the exhaust gases from the primary inlet to the inlet openings of the upstream end and that further communicates a portion of the exhaust gases outward along the sides of the filter block to a downstream end of the filter block;
   a filter end cover that directs the portion of the exhaust gases into the inlet openings of the downstream end of the filter block;
   at least one baffle support that both supports a downstream end of the filter block and that directs the exhaust gases from the outlet openings of the top and bottom sides of the filter block toward the primary outlet, the at least one baffle including an angled baffling portion that deflects exhaust gases coming out of the outlet openings of the filter block in a desired downstream direction;
   the baffle supports and the upstream inlet cone including exhaust-directing angled surfaces that extend at an acute angle to the longitudinal direction and being configured to direct the exhaust gases flowing through the exhaust filter assembly to flow with a more uniform flow and with less perpendicular wall structure creating turbulent resistance to flow;
   the at least one baffle support including an awning-like portion lying parallel and forming with the jacket subassembly a secondary insulating air gap, one of the jacket subassembly and awning-like portion including embossments to cause the secondary insulating air gap.

8. The assembly defined in claim 7, including shield members that form an air gap with the jacket and that also include angled flanges that communicate the exhaust gases to the outlet openings of the right and left sides.

9. The assembly defined in claim 7, wherein the inlet cone, the end cover, and the baffles define channels causing exhaust gas flow along all sides of the filter block and further cause exhaust gas flow out outlet openings of the filter block and further cause exhaust gas flow to a common single flow path out of the device.

10. The assembly defined in claim 7, wherein the inlet cone forms a fixed support at one end for the filter block and wherein the end cover, the baffles and the liner end cover combine to form a sliding support at another end of the filter block to accommodate dissimilar thermal expansion within the assembly.

* * * * *